United States Patent
She et al.

(10) Patent No.: US 12,416,845 B2
(45) Date of Patent: Sep. 16, 2025

(54) LIGHT SUPPLEMENTING APPARATUS FOR A DEVICE WITH A CAMERA AND A DEVICE WITH A CAMERA

(71) Applicant: HANGZHOU SUPERACME MICROELECTRONICS TECHNOLOGY CO., LTD., Hangzhou (CN)

(72) Inventors: Chenyu She, Hangzhou (CN); Guo Ai, Hangzhou (CN); Zuoxing Yang, Hangzhou (CN)

(73) Assignee: HANGZHOU SUPERACME MICROELECTRONICS TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/992,092

(22) PCT Filed: Mar. 11, 2024

(86) PCT No.: PCT/CN2024/080961
§ 371 (c)(1),
(2) Date: Jan. 7, 2025

(87) PCT Pub. No.: WO2024/230305
PCT Pub. Date: Nov. 14, 2024

(65) Prior Publication Data
US 2025/0264779 A1    Aug. 21, 2025

(30) Foreign Application Priority Data
May 11, 2023    (CN) .......................... 202321123088.7

(51) Int. Cl.
*G03B 15/03*    (2021.01)
*G03B 15/05*    (2021.01)
(Continued)

(52) U.S. Cl.
CPC ............. *G03B 15/05* (2013.01); *H04N 23/56* (2023.01); *H04N 23/651* (2023.01); *H04N 23/74* (2023.01); *G03B 2215/056* (2013.01)

(58) Field of Classification Search
USPC .................................. 396/157, 427; 348/143
See application file for complete search history.

(56) References Cited

U.S. PATENT DOCUMENTS 6,407,817 B1 *    6/2002   Norita ................ G01B 11/2518
                                                        356/3.04
11,080,649 B2 *   8/2021   Kim ..................... G06Q 10/087
(Continued)

FOREIGN PATENT DOCUMENTS

CA          2946039 C    *   6/2022   ....... H04N 21/42202
CN          102984510 A  *   3/2013
(Continued)

OTHER PUBLICATIONS

First Notification to Make Rectification for Chinese application No. 202321123088.7, dated Aug. 17, 2023.
(Continued)

*Primary Examiner* — Walter L Lindsay, Jr.
*Assistant Examiner* — Warren K Fenwick
(74) *Attorney, Agent, or Firm* — MARSHALL, GERSTEIN & BORUN LLP

(57) ABSTRACT

The present application discloses a light supplementing apparatus for a device with a camera and a device with a camera. The light supplementing apparatus is provided with two sensor modules on two horizontal sides of a camera, and detection directions of the two sensor modules are horizontally and reversely biased with respect to a photographing direction of the camera so that an overall detection range of the two sensor modules is larger than the photographing range of the camera. Thus, when the ambient illumination is (Continued)

low, the device with a camera may recognize a target object through the two sensor modules and turn on a light supplementing lamp only before the target object is about to enter a photographing visual field of the camera, instead of having to turn on the light supplementing lamp all the time, which reduces the power consumption of light supplementing.

18 Claims, 4 Drawing Sheets

(51) Int. Cl.
*H04N 23/56* (2023.01)
*H04N 23/65* (2023.01)
*H04N 23/74* (2023.01)

(56) References Cited

U.S. PATENT DOCUMENTS

| | | | | |
|---|---|---|---|---|
| 11,546,905 | B1 * | 1/2023 | Skarda | H04W 72/0453 |
| 11,756,531 | B1 * | 9/2023 | Farnsworth | G08B 1/08 |
| | | | | 704/231 |
| D1,018,626 | S * | 3/2024 | Clement | D16/203 |
| 12,008,891 | B2 * | 6/2024 | Van De Sluis | G08B 13/19663 |
| D1,059,457 | S * | 1/2025 | Clement | D16/203 |
| D1,078,122 | S * | 6/2025 | Clement | D26/72 |
| 2010/0091110 | A1 * | 4/2010 | Hildreth | G06F 3/011 |
| | | | | 348/169 |
| 2015/0163463 | A1 * | 6/2015 | Hwang | H04N 7/188 |
| | | | | 348/143 |

FOREIGN PATENT DOCUMENTS

| | | | | |
|---|---|---|---|---|
| CN | 106899803 | A | | 6/2017 |
| CN | 108289362 | A * | 7/2018 | H05B 47/16 |
| CN | 213186230 | U * | 5/2021 | |
| CN | 114222071 | A | | 3/2022 |
| CN | 219960696 | U | | 11/2023 |
| WO | WO-2019090503 | A1 | | 5/2019 |

OTHER PUBLICATIONS

Notice of Granting for Utility Patent for Chinese application No. 202321123088.7, dated Sep. 4, 2023.
International Search Report and Written Opinion for International Patent Application No. PCT/CN2024/080961, dated Jun. 11, 2024, 6 pages.

* cited by examiner

LIGHT SUPPLEMENTING APPARATUS FOR A DEVICE WITH A CAMERA AND A DEVICE WITH A CAMERA

TECHNICAL FIELD

The present application relates to the technical field of camera, and particularly to a light supplementing apparatus for a device with a camera and a device with a camera.

BACKGROUND ART

A device with a camera, such as a video camera and a mobile phone, is usually provided with a light supplementing apparatus, and the light supplementing apparatus is configured to supplement light to a photographing visual field of the camera to improve the photographing picture quality of the camera.

In the related art, when the ambient illumination is low, such as at night, the device with a camera turns on the light supplementing apparatus to improve the photographing picture quality of the camera so that the camera can clearly recognize the object.

However, always keeping the light supplementing apparatus on will cause an increase in the power consumption of the device with a camera.

SUMMARY OF THE INVENTION

With regard to at least one aspect of the above-mentioned technical problem, embodiments of the present application provide a light supplementing apparatus for a device with a camera and a device with a camera. The light supplementing apparatus provides a hardware platform which may reduce the power consumption of a light supplementing lamp, thereby solving the above-mentioned problem.

Embodiments of the present application provide a light supplementing apparatus for a device with a camera, and the device with a camera includes a camera. The light supplementing apparatus includes:

a sensor unit mounted on the device with a camera, where the sensor unit includes a first sensor module and a second sensor module which are provided on two horizontal sides of the camera and are configured to detect a target object before entering a photographing visual field of the camera (2) and output corresponding level states when the target object is detected;

a light supplementing lamp provided beside the camera, the light supplementing lamp being configured to emit light toward the photographing visual field of the camera; and a system controller mounted inside the device with a camera, where the system controller includes a first signal interface and a second signal interface; the first signal interface is connected to the sensor unit through a signal, and the second signal interface is connected to the light supplementing lamp through a signal, so that a level state of the system controller for driving the light supplementing lamp is controlled by the level state outputted by the sensor unit.

In an embodiment, a first detection direction of the first sensor module and a second detection direction of the second sensor module are configured to be horizontally biased with respect to a photographing direction of the camera, and horizontal biasing directions of the first detection direction and the second detection direction are opposite.

In an embodiment, a first detection head of the first sensor module and a second detection head of the second sensor module are arranged in a horizontal divergence manner with respect to the camera; or, the first detection head of the first sensor module and the second detection head of the second sensor module are arranged in a horizontal convergence manner with respect to the camera.

In an embodiment, the first sensor module includes at least one first sensor, the first sensor being a passive infrared radiation (PIR) sensor or a radar sensor.

In an embodiment, the second sensor module includes at least one second sensor, the second sensor being a PIR sensor or a radar sensor.

In an embodiment, the light supplementing apparatus further includes:

an image recognition chip mounted inside the device with a camera, where the image recognition chip is connected to the system controller through a signal;

the system controller further includes a third signal interface; the third signal interface is connected to the camera through a signal so that switching of the system controller between a low frame rate photographing mode and a high frame rate photographing mode is controlled by a recognition result of the image recognition chip on a photographing picture of the camera.

In an embodiment, a level state of the system controller for driving the camera to start the low frame rate photographing mode is controlled by the level state outputted by the sensor unit.

In an embodiment, the light supplementing lamp includes a first light supplementing source and a second light supplementing source;

a first light supplementing direction of the first light supplementing source and a second light supplementing direction of the second light supplementing source are configured to be consistent with a first detection direction and a second detection direction, respectively, where a level state of the system controller for driving the first light supplementing source is specifically controlled by the level state outputted by the first sensor module;

a level state of the system controller for driving the second light supplementing source is specifically controlled by the level state outputted by the second sensor module.

In an embodiment, the first light supplementing source and the second light supplementing source are provided on two horizontal sides of the camera, where an end of the first light supplementing source is provided with a first grating, and the first grating biases the first light supplementing direction so that the first light supplementing direction coincides with the first detection direction;

an end of the second light supplementing source is provided with a second grating, and the second grating biases the second light supplementing direction so that the second light supplementing direction is consistent with the second detection direction.

Embodiments of the present application also provide a device with a camera, the device with a camera including a light supplementing apparatus as described above.

One or more technical solutions provided in the embodiments of the present application have at least the following technical effects or advantages.

The embodiments of the present application provide a light supplementing apparatus for device with a camera and device with a camera. The light supplementing apparatus includes the sensor unit mounted on the device with a camera and the light supplementing lamp. The light supplementing lamp is provided beside the camera of the device with a camera and is configured to emit light to provide light supplementing support for the camera when needed. The sensor unit includes the first sensor module and the second sensor module which are provided on two horizontal sides of the camera and are configured to detect the target object before entering the photographing visual field of the camera (2) and output the corresponding level states when the target object is detected. In one embodiment, the detection directions of the two sensor modules may, for example, be configured to be horizontally biased with respect to the photographing direction of the camera, and the horizontal biasing directions of the two detection directions are opposite. It should be understood that, in this way, the two sensor modules can detect the target object before it enters the photographing visual field of the camera from either a left side or a right side (i.e., the target object is about to enter the photographing visual field of the camera). Then, the sensor unit and the light supplementing lamp are connected to the system controller of the device with a camera through signals so that the system controller may drive the light supplementing lamp to light up according to the level states outputted by the two sensor modules (for example, lighting up the light supplementing lamp by outputting a high level).

That is to say, the light supplementing apparatus provided by the present application provides the sensor modules on two horizontal sides of the camera, and the detection directions of the two sensor modules are horizontally and reversely biased so that an overall detection range of the two sensor modules is expanded to the left and right sides compared with the photographing visual field of the camera. In this way, whether the target object enters the photographing visual field of the camera from the left side or the right side, the two sensor modules can first detect the target object before it enters the photographing visual field. Then, the system controller of the device with a camera may drive the light supplementing lamp to light up according to a trigger signal of the sensor unit (i.e., a high level outputted by either of the two sensor modules) to provide light supplementing support. Thus, the device with a camera can clearly recognize the target object when performing subsequent photographing of a monitoring picture or performing motion recognition on the monitoring picture, etc.

It is important that, when the ambient illumination is low, the light supplementing lamp of the light supplementing apparatus in the present application does not have to be in a light-up state all the time, but the light supplementing lamp is driven to light up only after either of the two sensor modules detects the target object, thereby solving the technical problem of increasing the power consumption caused by enabling the light supplementing lamp to be in a light-up state all the time when the ambient illumination is low, greatly reducing the power consumption of light supplementing of the device with a camera, improving the endurance time of the device with a camera, and being convenient to use.

BRIEF DESCRIPTION OF THE DRAWINGS

In order to explain the technical solutions of the embodiments of the present invention more clearly, the drawings that need to be used in the description of the embodiments of the present invention will be briefly introduced below. Obviously, the drawings described below are only some embodiments of the present invention, and for a person skilled in the art, without involving any inventive effort, other drawings may be obtained according to these drawings.

REFERENCE NUMBERS

Figure 1:
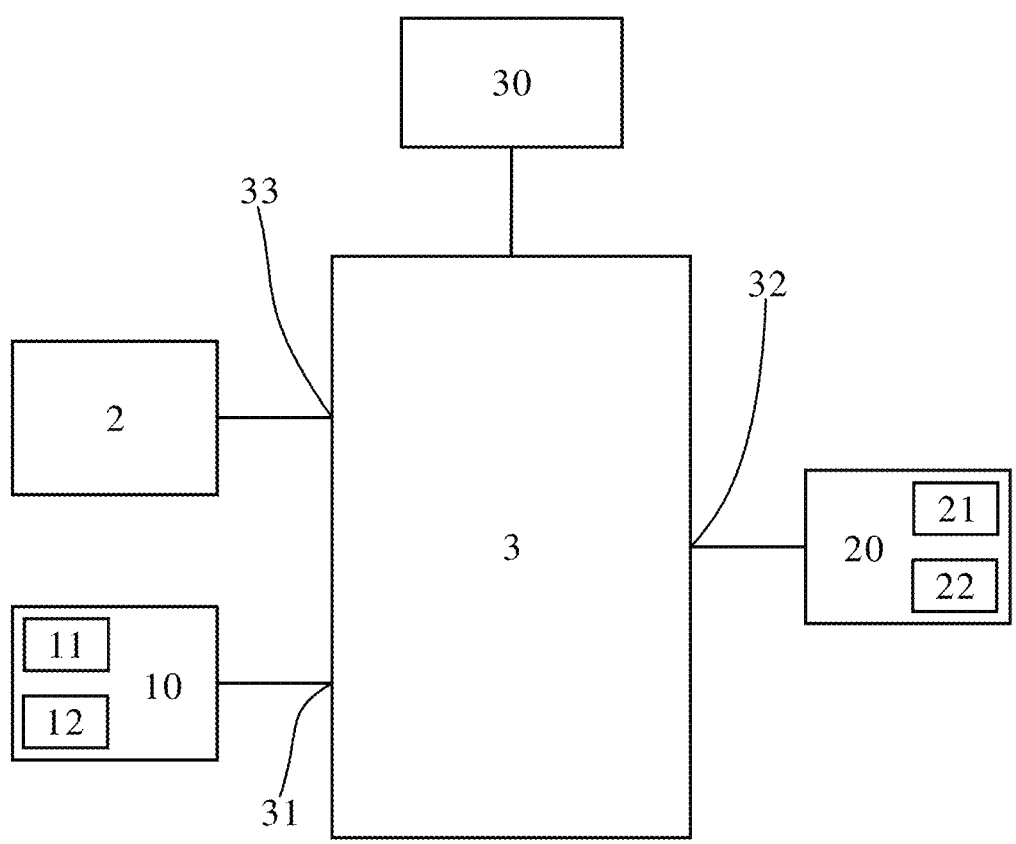
FIG. 1 is a structural diagram of a circuit of a light supplementing apparatus according to various embodiments of the present application.

1—device with a camera; 2—camera; 3—system controller;
31—first signal interface; 32—second signal interface; 33—third signal interface;
10—sensor unit; 11—first sensor module; 12—second sensor module;
20—light supplementing lamp; 21—first light supplementing source; 22—second light supplementing source; 23—first grating; 24—second grating;
30—image recognition chip;
X—photographing direction;
M1—first detection direction; M2—second detection direction;
N1—first light supplementing direction; and N2—second light supplementing direction.

DETAILED DESCRIPTION OF THE INVENTION

In order to better understand the above-mentioned technical solution, example embodiments of the present application are described in detail below with reference to the accompanying drawings. Obviously, the described embodiments are only a part of the embodiments of the present application and not all embodiments of the present application. It should be understood that the present application is not limited by the exemplary embodiments described herein.

A traditional device with a camera usually has a low power consumption mode. In the low power consumption mode, the device with a camera performs human body detection through a Passive Infrared Radiation, PIR sensor, wakes up a system-on-chip (SOC) after detecting a human body, and enters a high resolution and high frame rate photographing mode. After the photographing is completed, the device with a camera returns to the low power consumption mode again and waits for the next wake-up. One problem is that it takes about 200-300 ms from the PIR sensor waking up the SOC after detecting the human body to a first frame stabilized image, and sometimes key information is missed during this period, such as faces and human bodies.

Thus, in some applications, low resolution and low frame rate photographing, i.e., a pre-roll mode, is added in standby mode on the basis of the traditional device with a camera i.e., photographing may always be performed in a low power consumption mode with acceptable power consumption, and cyclic storage with a capacity of about several seconds is performed. Thus, the PIR sensor wakes up the SOC after detecting the presence of a human body, and the system of the device with a camera enters the high resolution and high frame rate photographing mode. In a period of several seconds before a first frame image with a high resolution, low resolution and low frame rate images in the pre-roll mode may be acquired simultaneously so that a video within a few seconds before triggering the SOC may be traced, which has a high use value.

In addition, since the PIR sensor of the device with a camera usually has the situations of missing detection and false detection, after the PIR sensor detects a human body, the device with a camera will add a motion detection (MD) function. That is, the MD function is turned on in the Pre-roll mode, and after the PIR sensor detects the presence of the human body, the device with a camera also needs to perform MD on a photographed picture. When a moving object is detected, the device enters the high resolution and high frame rate mode for photographing.

For example, at night, the picture photographed in the Pre-roll mode is dark due to the low ambient illumination. On the one hand, the target cannot be clearly recognized in the photographed picture, and on the other hand, the accuracy of MD will be greatly reduced, and even the object cannot be recognized for MD determination. Therefore, it is necessary to supplement light properly in a Pre-roll scene. The Pre-roll mode is a normal mode with a high power consumption requirement, and constant light supplementing will increase the power consumption. Thus, light is supplemented when needed, thereby resulting in less energy waste.

With regard to the above-mentioned situation, the present application proposes a light supplementing apparatus for a device with a camera and a device with a camera. The light supplementing apparatus is provided with two sensor modules on two horizontal sides of a camera, and detection directions of the two sensor modules are horizontally and reversely biased with respect to a photographing direction of the camera so that an overall detection range of the two sensor modules is larger than the photographing range of the camera. Thus, when the ambient illumination is low, the device with a camera may recognize a target object through the two sensor modules and turn on a light supplementing lamp only before the target object is about to enter a photographing visual field of the camera, instead of having to turn on the light supplementing lamp all the time, which reduces the power consumption of light supplementing.

A light supplementing apparatus for a device with a camera is provided, and the device with a camera 1 includes a camera 2. The light supplementing apparatus is configured to be mounted on the device with a camera 1 and includes a sensor unit 10, a light supplementing lamp 20, and a system controller 3.

The sensor unit 10 is mounted on the device with a camera 1 and includes a first sensor module 11 and a second sensor module 12 which are provided on two horizontal sides of the camera 2 and are configured to detect a target object before entering a photographing visual field of the camera 2 and output corresponding level states when the target object is detected.

The light supplementing lamp 20 is provided beside the camera 2 and is configured to emit light toward the photographing visual field of the camera 2.

The system controller 3 is mounted inside the device with a camera 1.

A first detection direction M1 of the first sensor module 11 and a second detection direction M2 of the second sensor module 12 are configured to be horizontally biased with respect to a photographing direction X of the camera 2, and horizontal biasing directions of the first detection direction M1 and the second detection direction M2 are opposite.

The system controller 3 includes a first signal interface 31 and a second signal interface 32. The first signal interface 31 is connected to the sensor unit 10 through a signal, and the second signal interface 32 is connected to the light supplementing lamp 20 through a signal so that a level state of the system controller 3 for driving the light supplementing lamp 20 is controlled by the level state outputted by the sensor unit 10. That is, the system controller 3 may drive the level state of the light supplementing lamp 20 according to the level state outputted by the sensor unit 10, thereby controlling whether or not the light supplementing lamp 20 is turned on.

Figure 2:
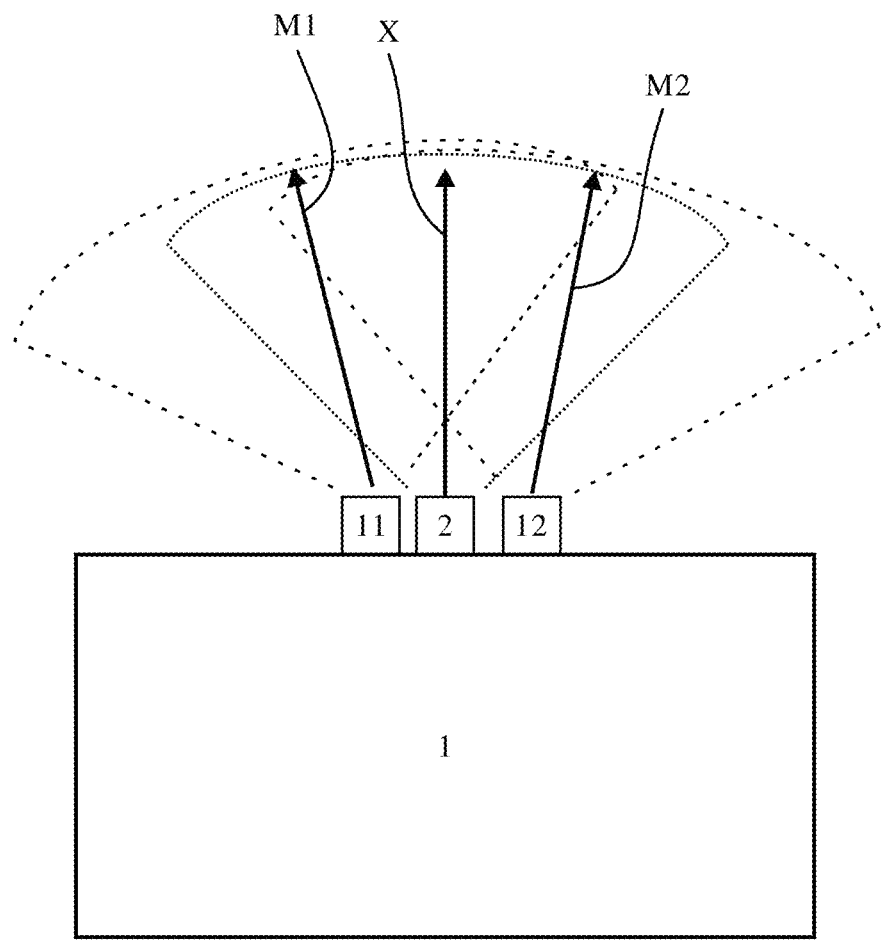
FIG. 2 is a structural diagram illustrating that a first sensor module and a second sensor module are provided on two horizontal sides of a camera according to various embodiments of the present application.
Figure 3:
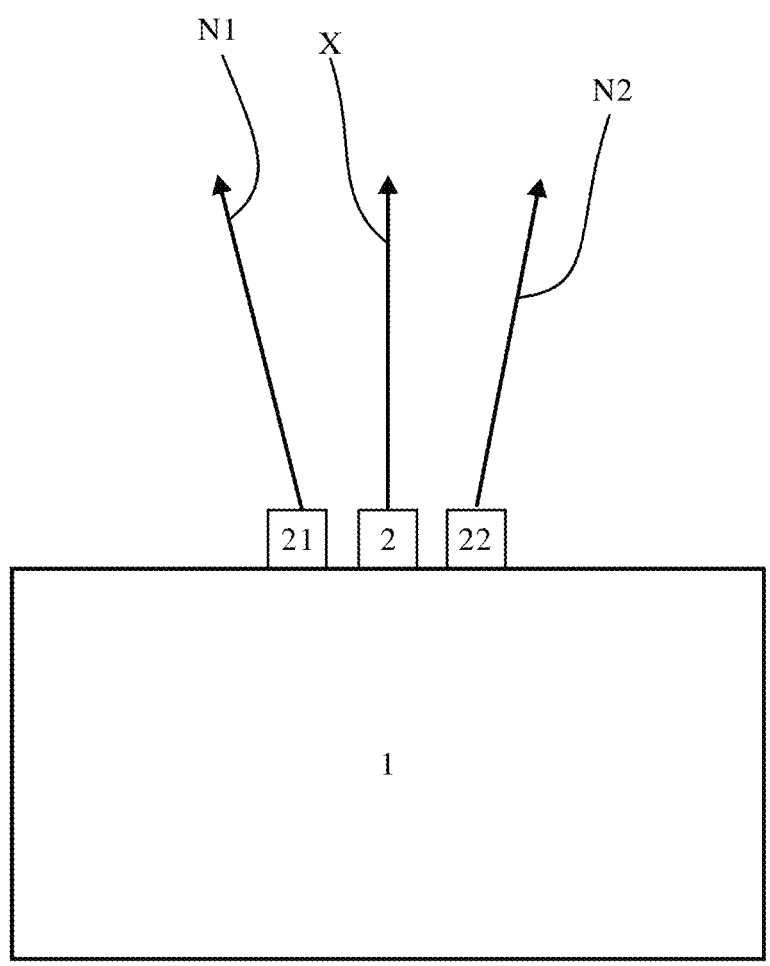
FIG. 3 is a structural diagram illustrating that a first light supplementing source and a second light supplementing source are provided on two horizontal sides of a camera according to various embodiments of the present application.
Figure 4:
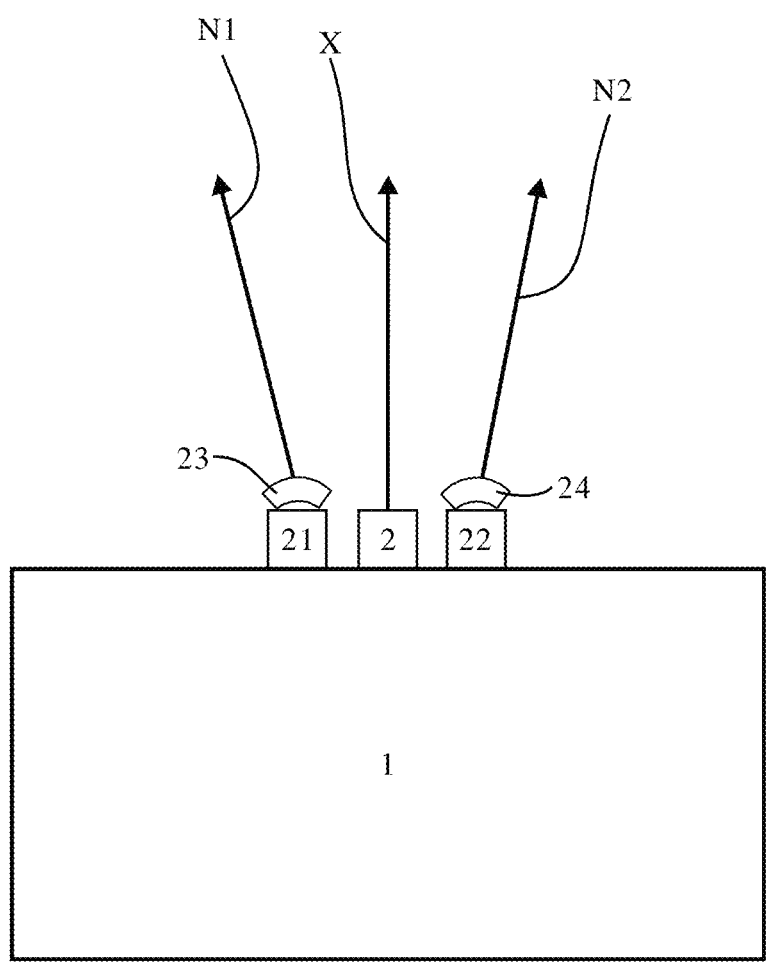
FIG. 4 is an installation structural diagram of a first grating and a second grating according to various embodiments of the present application.

With reference to FIGS. 1 and 2, the camera 2 is mounted on the device with a camera 1. The photographing direction X of the camera 2 is, for example, a vertical direction in FIG. 2, and the photographing visual field of the camera 2 is a sector region with X as a perpendicular bisector.

The sensor unit 10 includes the first sensor module 11 and the second sensor module 12, and the first sensor module 11 and the second sensor module 12 are provided on two horizontal sides of the camera 2 of the device with a camera 1. The first detection direction M1 of the first sensor module and the second detection direction M2 of the second sensor module are configured to be horizontally biased with respect to the photographing direction X of the camera, and the horizontal biasing directions of the two detection directions are opposite. For example, as shown in FIG. 2, the first detection direction M1 of the first sensor module 11 is biased to the left by an angle on the basis of the photographing direction X, and then a detection range of the first sensor module 11 (a sector region with M1 as a perpendicular bisector) is biased to the left by an angle. The second detection direction M2 of the second sensor module 12 is biased to the right by another angle on the basis of the photographing direction X, and then a detection range of the second sensor module 12 (a sector region with M2 as a perpendicular bisector) is biased to the right by an angle. The two biased angles may be the same or different. It can be understood that, at this time, since the detection directions of the two sensor modules are reversely biased with respect to the photographing direction of the camera, an overall detection range of the sensor unit (i.e., the superposition of the sector region with M1 as the perpendicular bisector and the sector region with M2 as the perpendicular bisector in FIG. 2) constituted by the two sensor modules is expanded to the left and right compared with the photographing visual field of the camera (the sector region with X as the perpendicular bisector).

For example, a horizontal angle of the photographing visual field of the camera is 100 degrees, and horizontal angles of detection visual fields of the first sensor module and the second sensor module are 110 degrees. If the photographing direction of the camera is the X direction, the first detection direction is biased to the left by 20 degrees compared with the photographing direction, and the second detection direction is biased to the right by 20 degrees compared with the photographing direction, i.e., the two detection directions are horizontally and reversely biased compared with the photographing direction. At this time, an overall detection visual field of the two sensor modules is expanded to the left and right sides compared with the photographing visual field. That is to say, the target object (e.g., a photographed person) is first found by the first sensor module or the second sensor module before entering the photographing visual field of the camera from the left side or the right side.

The light supplementing lamp is provided beside the camera, and the light supplementing lamp and the sensor unit are connected to the system controller of the device with a camera through signals. In this way, the system controller may drive the light supplementing lamp to light up according to a trigger signal of the sensor unit (i.e., a high level outputted by either of the two sensor modules).

With the embodiment in conjunction with the above description, for example, when the ambient illumination is low, the device with a camera is first in the Pre-roll mode. Then, when a target object is about to enter the photographing visual field of the camera, for example, from the left side, the first sensor module first detects the target object and outputs a high level before the target object enters the photographing visual field. At this time, the system controller of the device with a camera sets a control circuit of the light supplementing lamp to a high level state according to the high level, i.e., driving the light supplementing lamp to light up. In this way, by supplementing light in time, MD detection and high frame rate photographing to be performed subsequently by the device with a camera can improve the photographing picture quality. In addition, since the overall detection visual field of the sensor unit is expanded to the left and right compared with the photographing visual field, it is possible to find the target object in time to supplement light in time, without having to supplement light all the time which results in increased power consumption.

It should be understood that the above-mentioned system controller may be understood as a control circuit board of an existing device with a camera.

Embodiments of the present application provide a light supplementing apparatus for a device with a camera and a device with a camera, and the light supplementing apparatus includes the sensor unit mounted on the device with a camera and the light supplementing lamp. The light supplementing lamp is provided beside the camera of the device with a camera and is configured to emit light to provide light supplementing support for the camera when needed. The sensor unit includes the first sensor module and the second sensor module which are provided on two horizontal sides of the camera. The detection directions of the two sensor modules are configured to be horizontally biased with respect to the photographing direction of the camera, and the horizontal biasing directions of the two detection directions are opposite. It should be understood that, in this way, the two sensor modules can detect the target object before it enters the photographing visual field of the camera from either a left side or a right side (i.e., the target object is about to enter the photographing visual field of the camera). Then, the sensor unit and the light supplementing lamp are connected to the system controller of the device with a camera through signals so that the system controller may drive the light supplementing lamp to light up according to the level states outputted by the two sensor modules (i.e., lighting up the light supplementing lamp by outputting a high level).

That is to say, the light supplementing apparatus provided by the present application provides the sensor modules on two horizontal sides of the camera, and the detection directions of the two sensor modules are horizontally and reversely biased so that an overall detection range of the two sensor modules is expanded to the left and right sides compared with the photographing visual field of the camera. In this way, whether the target object enters the photographing visual field of the camera from the left side or the right side, the two sensor modules can first detect the target object before it enters the photographing visual field. Then, the system controller of the device with a camera may drive the light supplementing lamp to light up according to a trigger signal of the sensor unit (i.e., a high level outputted by either of the two sensor modules) to provide light supplementing support. Thus, the device with a camera can clearly recognize the target object when performing subsequent photographing of a monitoring picture or performing motion recognition on the monitoring picture, etc.

It is important that, when the ambient illumination is low, the light supplementing lamp of the light supplementing apparatus in the present application does not have to be in a light-up state all the time, but the light supplementing lamp is driven to light up only after either of the two sensor modules detects the target object, thereby solving the technical problem of increasing the power consumption caused by enabling the light supplementing lamp to be in a light-up state all the time when the ambient illumination is low, greatly reducing the power consumption of light supplementing of the device with a camera, improving the endurance time of the device with a camera, and being convenient to use.

In one possible implementation, a first detection head of the first sensor module 11 and a second detection head of the second sensor module 12 are arranged in a horizontal divergence manner with respect to the camera 2. Alternatively, the first detection head of the first sensor module 11 and the second detection head of the second sensor module 12 are arranged in a horizontal convergence manner with respect to the camera 2.

That is, the embodiment discloses one possible structure in which the first detection direction and the second detection direction are horizontally and reversely biased with respect to the photographing direction.

By arranging the first detection head of the first sensor module and the second detection head of the second sensor module in a horizontal divergence manner or in a horizontal convergence manner with respect to the camera, it can be realized that the two detection directions are horizontally and reversely biased with respect to the photographing direction, and the structure is simple and easy to realize.

In an embodiment, the first sensor module 11 includes at least one first sensor, and the first sensor is the PIR sensor or a radar sensor. Similarly, the second sensor module 12 includes at least one second sensor, and the second sensor is the PIR sensor or the radar sensor.

That is, the first sensor module may include one PIR sensor, one radar sensor, or a combination of the PIR sensor and the radar sensor. The second sensor module is similar to the first sensor module and will not be described in detail.

That is to say, for each sensor module, it is possible to use the PIR sensor alone or the radar sensor alone, and of course, it is also possible to use a combination of the PIR sensor and the radar sensor to reduce a missing detection rate.

In one possible implementation, the light supplementing apparatus further includes an image recognition chip 30, and the image recognition chip 30 is mounted inside the device with a camera 1. The image recognition chip 30 is connected to the system controller 3 through a signal. The system controller 3 further includes a third signal interface. The third signal interface 33 is connected to the camera 2 through a signal so that switching of the system controller 3 between a low frame rate photographing mode and a high frame rate photographing mode is controlled by a recognition result of the image recognition chip 30 on a photographing picture of the camera 2. That is, the system controller 3 may switch between the low frame rate photographing mode and the high frame rate photographing mode according to the recognition result of the image recognition chip 30 on the photographing picture of the camera 2.

That is, the system controller of the light supplementing apparatus is also connected to the image recognition chip and the camera through signals so that the following functions may be realized.

For example, the system controller first drives the camera to be in the low frame rate photographing mode, and after the above-mentioned sensor unit detects the target object, the system controller drives the light supplementing lamp to light up. Meanwhile, the system controller transmits the photographing picture of the camera to the image recognition chip, and the image recognition chip performs MD on the photographing picture. After the movement of the target object is detected (i.e., the target object enters the photographing visual field of the camera), the image recognition chip outputs a recognition result indicating the movement of the target object. At this time, the system controller switches the photographing mode of the camera from the low frame rate photographing mode to the high frame rate photographing mode according to the recognition result of the movement of the target object.

Of course, for example, the target object continues to move until it moves out of the photographing visual field of the camera, and at this time, the image recognition chip performs MD on the photographing picture and then outputs a recognition result that the target object is not detected. At this time, it can be understood that the system controller may switch the photographing mode of the camera from the high frame rate photographing mode to the low frame rate photographing mode according to the recognition result that the target object is not detected.

It should be noted that the above-mentioned image recognition chip may be a chip that runs an existing image recognition algorithm.

In an embodiment, a level state of the system controller 3 for driving the camera 2 to start the low frame rate photographing mode is controlled by the level state outputted by the sensor unit 10. That is, the system controller 3 may determine the level state of whether to drive the camera 2 to start the low frame rate photographing mode according to the level state outputted by the sensor unit 10.

That is, the light supplementing apparatus may also realize the following functions.

For example, the system controller first drives the camera to be in a standby state, and at this time, the camera does not photograph a picture. After the above-mentioned sensor unit detects the target object, the system controller drives the light supplementing lamp to light up. Meanwhile, the system controller drives the camera to turn on the low frame rate photographing mode, and the above-mentioned image recognition chip performs MD on the photographing picture.

Thus, after the target object is detected, the low frame rate photographing mode is turned on so that the power consumption of light supplementing may be further reduced.

In one possible implementation, the light supplementing lamp 20 includes a first light supplementing source 21 and a second light supplementing source 22. A first light supplementing direction N1 of the first light supplementing source 21 and a second light supplementing direction N2 of the second light supplementing source 22 are configured to be consistent with the first detection direction M1 and the second detection direction M2, respectively. A level state for driving the first light supplementing source 21 by the system controller 3, is specifically controlled by the level state outputted by the first sensor module 11, i.e., the system controller 3 is configured to drive the level state of the first light supplementing source 21 according to the level state outputted by the first sensor module 11. A level state for driving the second light supplementing source 22 by the system controller 3, is specifically controlled by the level state outputted by the second sensor module 12, i.e., the system controller 3 is configured to drive the level state of the second light supplementing source 22 according to the level state outputted by the second sensor module 12.

In the embodiment, the light supplementing lamp is divided into two independent light supplementing sources, i.e., the first light supplementing source and the second light supplementing source, and the light supplementing directions of the two light supplementing sources are substantially consistent with the detection directions of the two sensor modules, respectively. In this way, the system controller may drive the light supplementing source in a corresponding detection direction to perform targeted light supplementing according to different level states outputted by the sensor module, without having to light up the whole light supplementing lamp, thereby further reducing the power consumption.

It can be understood that the above-mentioned light supplementing direction may be understood to be perpendicular to a normal direction of the light supplementing source, and a light supplementing range is a sector region with the normal direction of the light supplementing source as a perpendicular bisector. Similarly, the above-mentioned detection direction may be understood to be perpendicular to a normal direction of the detection head, and a detection range is a sector region with the normal direction of the detection head as a perpendicular bisector.

In the embodiment, the first light supplementing direction is provided to be consistent with the first detection direction so that the light supplementing range of the first light supplementing source may approximately cover or slightly exceed the detection range of the first sensor module. Similarly, the light supplementing range of the second light supplementing source may approximately cover or slightly exceed the detection range of the second sensor module.

With regard to the specific structural arrangement of the above-mentioned two light supplementing sources, in an embodiment, the first light supplementing source 21 and the second light supplementing source 22 are provided on two horizontal sides of the camera 2. The first light supplementing source 21 and the second light supplementing source 22 are arranged in a horizontal divergence manner with respect to the camera 2. Alternatively, the first light supplementing source 21 and the second light supplementing source 22 are arranged in a horizontal convergence manner with respect to the camera 2.

That is, one possible structure is as follows. Similarly to the above-mentioned two detection apparatuses, the two light supplementing sources are also provided on two horizontal sides of the camera, and the two light supplementing sources on the two sides are arranged in a horizontal divergence manner or in a horizontal convergence manner with respect to the camera so that the first light supplementing direction of the first light supplementing source coincides with the first detection direction of the first sensor module, and the second light supplementing direction of the second light supplementing source coincides with the second detection direction of the second sensor module.

With regard to the specific structural arrangement of the above-mentioned two light supplementing sources, in another embodiment, the first light supplementing source 21 and the second light supplementing source 22 are provided on two horizontal sides of the camera 2. An end of the first light supplementing source 21 is provided with a first grating 23, and the first grating 23 biases the first light supplementing direction N1 so that the first light supplementing direction N1 coincides with the first detection direction M1. An end of the second light supplementing source 22 is provided with a second grating 24, and the second grating 24 biases the second light supplementing direction N2 so that the second light supplementing direction N2 coincides with the second detection direction M2.

That is, in addition to biasing the light supplementing sources with respect to the camera, gratings for biasing light rays may be mounted on the ends of the light supplementing sources so that the two light supplementing directions coincide with the two detection directions, respectively.

Based on the above-mentioned light supplementing apparatus, the present application further discloses a device with a camera including the above-mentioned light supplementing apparatus.

While the basic principles of the present application have been described above in conjunction with specific embodiments, it is to be noted that the benefits, advantages, effects, etc. mentioned in the present application are merely exemplary and not limiting, and are not to be construed as necessarily possessed by the various embodiments of the present application. Furthermore, the specific details disclosed above are for purposes of illustration and description only and are not intended to be limiting, and the present application is not limited to implemented using the specific details disclosed above.

The block diagrams of components, apparatuses, devices, and systems referred to in the present application are merely exemplary examples and are not intended to require or imply that the connections, arrangements, and configurations must be made in the manner shown in the block diagrams. The components, apparatuses, and systems may be connected, arranged, and configured in any manner, as will be appreciated by a person skilled in the art. Words such as "including", "containing", "having", and the like are open-ended words that mean "including, but not limited to", and may be used interchangeably therewith. As used herein, the words "or" and "and" refer to the word "and/or" and may be used interchangeably therewith unless the context clearly indicates otherwise. As used herein, the word "such as" refers to the phrase "such as, but not limited to", and may be used interchangeably therewith.

It should also be noted that in the apparatus, device, and method of the present application, the components or steps may be decomposed and/or recombined. These decompositions and/or recombinations should be considered as equivalents to the present application.

The previous description of the disclosed aspects is provided to enable any person skilled in the art to make or use the present application. Various modifications to these aspects will be readily apparent to a person skilled in the art, and the generic principles defined herein may be applied to other aspects without departing from the scope of the present application. Therefore, the present application is not intended to be limited to the aspects shown herein but is to be accorded the widest scope consistent with the principles and novel features disclosed herein.

The above description has been presented for the purposes of illustration and description. Furthermore, this description is not intended to limit the embodiments of the present application to the form disclosed herein. While various exemplary aspects and embodiments have been discussed above, a person skilled in the art will recognize that certain variations, modifications, changes, additions, and sub-combinations thereof are to be included within the scope of the present invention.

The invention claimed is:

1. A light supplementing apparatus for a device with a camera, the light supplementing apparatus is configured to mount on the device with a camera, the device with a camera comprising a camera, wherein the light supplementing apparatus comprises:
    a sensor unit mounted on the device with a camera, wherein the sensor unit comprises a first sensor module and a second sensor module which are provided on two horizontal sides of the camera;
    a light supplementing lamp provided beside the camera, the light supplementing lamp being configured to emit light toward the photographing visual field of the camera; and
    a system controller mounted inside the device with a camera,
    wherein the system controller comprises a first signal interface and a second signal interface; the first signal interface is connected to the sensor unit through a signal, and the second signal interface is connected to the light supplementing lamp through a signal, so that a level state of the system controller for driving the light supplementing lamp is controlled by the level state outputted by the sensor unit.

2. The light supplementing apparatus according to claim 1, wherein a first detection direction (M1) of the first sensor module and a second detection direction (M2) of the second sensor module are configured to be horizontally biased with respect to a photographing direction (X) of the camera, and horizontal biasing directions of the first detection direction (M1) and the second detection direction (M2) are opposite.

3. The light supplementing apparatus according to claim 2, wherein a first detection head of the first sensor module and a second detection head of the second sensor module are arranged in a horizontal divergence manner with respect to the camera; or,
    the first detection head of the first sensor module and the second detection head of the second sensor module are arranged in a horizontal convergence manner with respect to the camera.

4. The light supplementing apparatus according to claim 1, wherein the first sensor module comprises at least one first sensor, the first sensor being a passive infrared radiation (PIR) sensor or a radar sensor.

5. The light supplementing apparatus according to claim 1, wherein the second sensor module comprises at least one second sensor, the second sensor being a PIR sensor or a radar sensor.

6. The light supplementing apparatus according to claim 1, further comprising:
    an image recognition chip, mounted inside the device with a camera, wherein the image recognition chip is connected to the system controller through a signal;

the system controller further comprises a third signal interface; the third signal interface is connected to the camera through a signal so that switching of the system controller between a low frame rate photographing mode and a high frame rate photographing mode is controlled by a recognition result of the image recognition chip on a photographing picture of the camera.

7. The light supplementing apparatus according to claim 6, wherein a level state of the system controller for driving the camera to start the low frame rate photographing mode is controlled by the level state outputted by the sensor unit.

8. The light supplementing apparatus according to claim 1, wherein the light supplementing lamp comprises a first light supplementing source and a second light supplementing source;

a first light supplementing direction (N1) of the first light supplementing source and a second light supplementing direction (N2) of the second light supplementing source are configured to be consistent with a first detection direction (M1) and a second detection direction (M2), respectively, wherein a level state of the system controller for driving the first light supplementing source is specifically controlled by the level state outputted by the first sensor module; or a level state of the system controller for driving the second light supplementing source is specifically controlled by the level state outputted by the second sensor module.

9. The light supplementing apparatus according to claim 8, wherein the first light supplementing source and the second light supplementing source are provided on two horizontal sides of the camera, wherein an end of the first light supplementing source is provided with a first grating, and the first grating biases the first light supplementing direction (N1) so that the first light supplementing direction (N1) is consistent with the first detection direction (M1); or an end of the second light supplementing source is provided with a second grating, and the second grating biases the second light supplementing direction (N2) so that the second light supplementing direction (N2) coincides with the second detection direction (M2).

10. A device with a camera, comprising a light supplementing apparatus; wherein the light supplementing apparatus comprises:

a sensor unit mounted on the device with a camera, wherein the sensor unit comprises a first sensor module and a second sensor module which are provided on two horizontal sides of the camera;

a light supplementing lamp provided beside the camera, the light supplementing lamp being configured to emit light toward the photographing visual field of the camera; and a system controller mounted inside the device with a camera, wherein the system controller comprises a first signal interface and a second signal interface; the first signal interface is connected to the sensor unit through a signal, and the second signal interface is connected to the light supplementing lamp through a signal, so that a level state of the system controller for driving the light supplementing lamp is controlled by the level state outputted by the sensor unit.

11. The device with a camera according to claim 10, wherein a first detection direction (M1) of the first sensor module and a second detection direction (M2) of the second sensor module are configured to be horizontally biased with respect to a photographing direction (X) of the camera, and horizontal biasing directions of the first detection direction (M1) and the second detection direction (M2) are opposite.

12. The device with a camera according to claim 11, wherein a first detection head of the first sensor module and a second detection head of the second sensor module are arranged in a horizontal divergence manner with respect to the camera; or, the first detection head of the first sensor module and the second detection head of the second sensor module are arranged in a horizontal convergence manner with respect to the camera.

13. The device with a camera according to claim 10, wherein the first sensor module comprises at least one first sensor, the first sensor being a passive infrared radiation (PIR) sensor or a radar sensor.

14. The device with a camera according to claim 10, wherein the second sensor module comprises at least one second sensor, the second sensor being a PIR sensor or a radar sensor.

15. The device with a camera according to claim 10, wherein the light supplementing apparatus further comprises:

an image recognition chip, mounted inside the device with a camera, wherein the image recognition chip is connected to the system controller through a signal;

the system controller further comprises a third signal interface; the third signal interface is connected to the camera through a signal so that switching of the system controller between a low frame rate photographing mode and a high frame rate photographing mode is controlled by a recognition result of the image recognition chip on a photographing picture of the camera.

16. The device with a camera according to claim 15, wherein a level state of the system controller for driving the camera to start the low frame rate photographing mode is controlled by the level state outputted by the sensor unit.

17. The device with a camera according to claim 10, wherein the light supplementing lamp comprises a first light supplementing source and a second light supplementing source;

a first light supplementing direction (N1) of the first light supplementing source and a second light supplementing direction (N2) of the second light supplementing source are configured to be consistent with a first detection direction (M1) and a second detection direction (M2), respectively, wherein a level state of the system controller for driving the first light supplementing source is specifically controlled by the level state outputted by the first sensor module; or a level state of the system controller for driving the second light supplementing source is specifically controlled by the level state outputted by the second sensor module.

18. The device with a camera according to claim 17, wherein the first light supplementing source and the second light supplementing source are provided on two horizontal sides of the camera, wherein an end of the first light supplementing source is provided with a first grating, and the first grating biases the first light supplementing direction (N1) so that the first light supplementing direction (N1) is consistent with the first detection direction (M1); or an end of the second light supplementing source is provided with a second grating, and the second grating biases the second light supplementing direction (N2) so that the second light supplementing direction (N2) coincides with the second detection direction (M2).

\* \* \* \* \*